United States Patent
Karanassos

(10) Patent No.: US 8,638,779 B2
(45) Date of Patent: Jan. 28, 2014

(54) METHODS AND APPARATUS FOR MANAGING VOICE OVER IP TELEPHONY

(75) Inventor: James Karanassos, Manasquan, NJ (US)

(73) Assignee: ITXC IP Holdings SARL, Princeton, NJ (US)

( * ) Notice: Subject to any disclaimer, the term of this patent is extended or adjusted under 35 U.S.C. 154(b) by 1242 days.

(21) Appl. No.: 10/785,216

(22) Filed: Feb. 24, 2004

(65) Prior Publication Data

US 2005/0185657 A1 Aug. 25, 2005

(51) Int. Cl.
*H04L 12/66* (2006.01)

(52) U.S. Cl.
USPC .................. 370/352; 370/356; 370/401

(58) Field of Classification Search
USPC .................. 370/401–404, 352–356, 395.2
See application file for complete search history.

(56) References Cited

U.S. PATENT DOCUMENTS

| | | | |
|---|---|---|---|
| 6,298,056 B1 | 10/2001 | Pendse | 370/352 |
| 6,553,515 B1 * | 4/2003 | Gross et al. | 714/47.2 |
| 6,628,760 B2 | 9/2003 | Mirashrafi et al. | 379/88.17 |
| 6,922,465 B1 * | 7/2005 | Howe | 379/76 |
| 6,993,119 B1 * | 1/2006 | Zhang et al. | 379/88.01 |
| 7,039,164 B1 * | 5/2006 | Howe | 379/88.05 |
| 7,254,832 B1 * | 8/2007 | Christie, IV | 726/11 |
| 7,356,136 B2 * | 4/2008 | Eshun et al. | 379/201.12 |
| 7,391,765 B2 * | 6/2008 | Tezuka et al. | 370/356 |
| 7,421,734 B2 * | 9/2008 | Ormazabal et al. | 726/11 |
| 7,440,566 B2 * | 10/2008 | Masuhiro et al. | 379/221.04 |
| 7,483,400 B2 * | 1/2009 | Kuusinen et al. | 370/267 |
| 7,548,611 B2 * | 6/2009 | Howe | 379/88.05 |
| 7,564,835 B1 * | 7/2009 | Grabelsky et al. | 370/352 |
| 7,567,560 B1 * | 7/2009 | Balasubramaniyan | 370/389 |
| 7,570,617 B2 * | 8/2009 | Kil et al. | 370/331 |
| 7,602,704 B2 * | 10/2009 | Shaffer et al. | 370/218 |
| 7,657,641 B2 * | 2/2010 | Kang et al. | 709/230 |
| 7,801,912 B2 * | 9/2010 | Ransil et al. | 707/770 |
| 7,817,619 B1 * | 10/2010 | Curry et al. | 370/352 |
| 8,169,937 B2 * | 5/2012 | Kuusinen et al. | 370/267 |
| 8,239,468 B2 * | 8/2012 | Ikeda et al. | 709/206 |
| 2003/0107991 A1 * | 6/2003 | Tezuka et al. | 370/229 |
| 2005/0105508 A1 * | 5/2005 | Saha | 370/352 |

OTHER PUBLICATIONS

Protocol Overview: RTP and RTCP, by: Tommy Koistinen, Nokia Telecommunications.
Unlicensed vs. Licensed High Bandwidth Wireless Links, by: Erik Boch. CTO, DragonWave Inc. (Feb. 2003).

* cited by examiner

*Primary Examiner* — Brian O'Connor
(74) *Attorney, Agent, or Firm* — Kaplan Breyer Schwarz & Ottesen, LLP

(57) ABSTRACT

Methods and apparatus are provided for: obtaining information at an administrative entity concerning one or more voice-over-Internet (VOI) calls gathered at one or more session controllers operatively coupled between one or more packet switched networks and one or more public switched telephone networks; analyzing the information to determine whether any of the calls are inactive; and sending at least one command from the administrative entity to the one or more session controllers that causes the session controllers to drop any VOIP calls that are determined to be inactive.

38 Claims, 3 Drawing Sheets

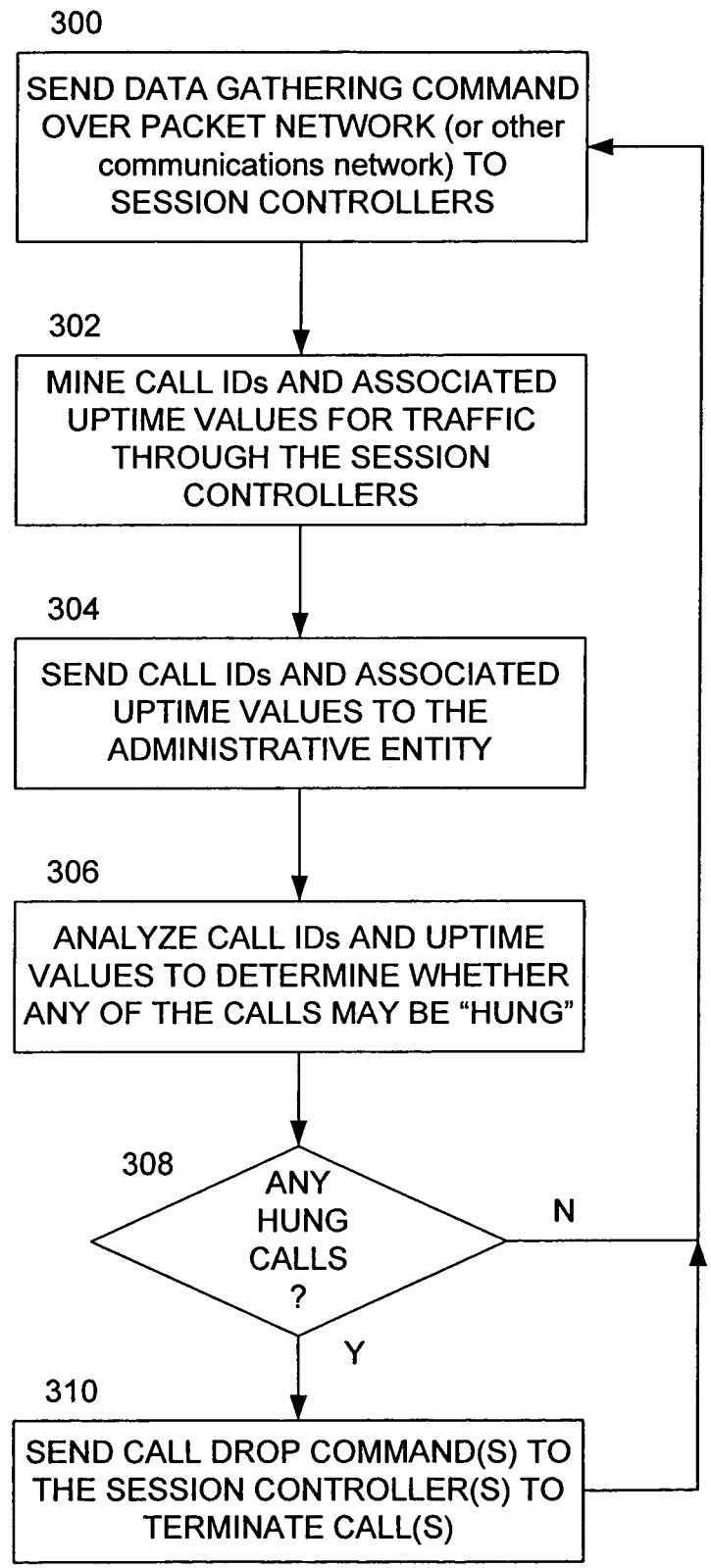

METHODS AND APPARATUS FOR MANAGING VOICE OVER IP TELEPHONY

BACKGROUND OF THE INVENTION

The present invention involves the field of telecommunications and, in particular, the invention relates to methods and apparatus for managing Voice Over Internet (VOIP) calls, for example terminating in a Public Switching Telephone Network (PSTN).

Numerous advances have been made in the field of telecommunications. In particular, the field of Internet telephony has emerged as a viable technology that is evolving at an ever increasing rate. Evidence of this evolution of Internet telephony is best characterized by the number of products that have become available in the market. Products such as CoolTalk by Netscape Communications Corporation of Mountain View, Calif.; Internet Connection Phone by International Business Machines of Amonk, N.Y.; Intel Internet Phone (IPhone) by Intel Corporation of Santa Clara, Calif.; NetMeeting by Microsoft Corporation, Redmond, Wash.; Quarterdeck WebTalk by Quarterdeck Corporation of Marina Del Rey, Calif.; TeleVox by Voxware Incorporated of Princeton, N.J.; and WebPhone by Netspeak Corporation of Boca Raton, Fla., are representative of the current state of applications facilitating Internet telephony.

Each of these products offers Internet based voice communications with a telephone motif, between two users each using the same (or compatible) product on either end of the Internet connection. That is, the Internet provides the "switching" architecture for the system, while the computer acts as the "handset", or the audio interface. One reason for the proliferation of these applications is a desire to push the technology of the Internet to provide a total communications tool. The appeal to users is that the use of the Internet is free of toll charges. Therefore, a user of an Internet phone product may communicate with another user located anywhere else in the world without having to pay the long distance charges associated with making a telephone call using the PSTN.

It is noted that a VOIP call need not involve the use of client terminals (user computers) at each end thereof as is the case with the above products. Indeed, any type of telephone terminal, handset, cell phone, etc. may be used to initiate or receive a VOIP call by connecting to a PSTN and thereafter traveling through the Internet over one or more gateways.

The PSTN is a circuit switched network. That is to say that the PSTN assigns a dedicated communication line to a user with which to complete the telephone call, wherein the user can utilize the assigned resource of the PSTN in any way they choose. It is understood that the user is paying for the use of the dedicated resource of the PSTN. While the circuit switched approach of the PSTN system is not necessarily the most efficient system in terms of call traffic (i.e., it does not make use of the "dead space" common in a conversation), it is relatively easy to ensure that information destined for a particular user is delivered. The PSTN provides a dedicated line to complete the transaction.

The Internet is a packet switched network, where communication is accomplished by breaking the transmitted data into varying-sized packages (or "packets"), based primarily on communication content, and interleaving the packets to best utilize the bandwidth available at any given time on the Internet. When the packets reach their intended destination, they must be reassembled into the originally transmitted data. Loss of packets, and thus data, occur frequently in such a network, and the ability of the network to successfully transmit information from one point in the network to another determines the quality of the network. For inter-computer communication transactions involving non real-time data, the ability to transmit packets and retransmit any packets that are perceived to have been dropped is not a severe limitation and may not even be perceived by the user of the system. However, in a voice communication transaction, the delay required to retransmit even one data packet may be perceived by a user.

A system of gateways disposed on the Internet facilitates VOIP telephony by permitting the gateways to act as protocol bridges between the PSTN and the Internet. For example, ITXC Corporation of Princeton, N.J. operates a global VOIP network, called ITXC.net®, which can facilitate a VOIP call that traverses both PSTN networks and packet switched networks like the Internet. The originator of a VOIP call may use a standard telephone connected to a first PSTN to dial a telephone number of another person on a different PSTN. A number of trunk lines of the first PSTN connect to a plurality of gateways (servers) that connect the first PSTN to a packet switched network, such as the Internet. One of the gateway servers (say an initiator gateway) will handle the initiated call from the first PSTN. In particular, the initiator gateway will send its position in the network along with the telephone number of the other person (within the second PSTN) to a rate engine/directory gatekeeper. The rate engine/directory gatekeeper determines which of many other gateways should be used to complete the call to the telephone number in the second PSTN (say a terminator gateway) and transmits this information to the initiator gateway. The rate engine/directory gatekeeper also keeps accounting information in accordance with well-known clearinghouse billing models. The initiator gateway then establishes a call connection with the terminator gateway (which may involve routing the call through a number of intermediate servers on the Internet). The terminator gateway completes the call to the other person by connecting to the second PSTN over one of the trunk lines thereof.

Further details of certain portions of the ITXC.net® global network and other associated elements and systems may be found in U.S. Pat. Nos. 6,628,760; 6,404,864; 6,310,941; 6,304,637; 6,298,056; and 6,212,192, the entire disclosures of which are hereby incorporated by reference.

Although advancements are being made in the technologies associated with VOIP telephony, both users and service providers are generally satisfied with the current state of the art in so far as quality of service and billing are concerned. This is not to say, however, that problems do not occur. For example, from time to time the terminator gateway may act as if the VOIP call is active despite the fact that the call is actually inactive and that the initiator gateway recognizes that the call has ended. This can create a significant problem in connection with billing, in as much as a substantial discrepancy can exist between the number of call minutes that the initiator gateway records as compared with the number of calling minutes that the terminator gateway records. These calls are referred to as "hung calls" or "long calls" in the art and the discrepancies that result may be measured in minutes, hours, and even days. Hung calls result in significant loss of revenues either because the discrepancy may not be resolved or because significant resources in terms of personnel and lost opportunities may be required to resolve any such discrepancies.

An existing technique for mitigating the discrepancies associated with hung calls involves the use of so-called RTCP timers, which measure the flow of RTCP packets that are transmitted and received in connection with the call. Each of the gateways in the system employ the RTCP timers to determine whether sufficient data packets are flowing as a measure of whether the call is active or inactive. For example, if in a given call no RTCP packets flow within a 55 second time period, then the gateway takes steps to tear down the call. Although the use of RTCP timers are helpful in combating hung calls and the billing discrepancies associated therewith, they are not effective 100% of the time. Indeed, substantial data packet latency and/or packet loss may affect the ability of the RTCP timers to detect a hung call, thereby permitting the hung call to remain and the discrepancy to occur.

A conventional technique to address a hung call that is not detected by the RTCP timers involves the use of a tool command language script that is stored within each of the gateways in the system. On a periodic basis, the script is executed in order to determine whether any calls have an up-time over a predetermined threshold, such as 180 minutes. Thus, the script technique ensures that no discrepancy can exceed 180 minutes.

Unfortunately, the use of scripts that reside at the respective gateways of the system are problematic for several reasons. First, a service provider must have access to each of the gateways in order to load the script and ensure that it operates properly. Second, once the script is loaded into a given gateway, the predetermined threshold (e.g., 180 minutes) is fixed and cannot be altered without a significant retrofit activity in which new scripts are loaded into each of the gateways of the system. It is noted that the aforementioned problems are exacerbated when the gateways are not owned by the service provider seeking to minimize the number and extent of hung calls. Indeed, any number of third party entities may own the gateways, thereby presenting a significant obstacle in terms of implementing a script routine. Finally, the invocation and execution of a script at the gateways of the system represents a significant overhead activity that reduces transmission efficiency and data throughput.

Accordingly, there are needs in the art for new methods and apparatus of managing VOIP calls, particularly with respect to minimizing the occurrences and extent of hung calls.

SUMMARY OF THE INVENTION

In accordance with one or more aspects of the present invention, a method includes: obtaining information at an administrative entity concerning one or more voice-over-Internet (VOI) calls gathered at one or more session controllers operatively coupled between one or more packet switched networks and one or more public switched telephone networks; analyzing the information to determine whether any of the calls are inactive; and sending at least one command from the administrative entity to the one or more session controllers that causes the session controllers to drop any VOIP calls that are determined to be inactive.

Preferably, the information concerning the VOIP calls includes call IDs and uptime values. The step of analyzing the information may include determining whether any of the uptime values exceeds a threshold level. Preferably, a determination is made that a given call is inactive when the uptime value of that call exceeds the threshold level. The threshold level may be variable dependent on one or more other parameters, or it may be fixed, such as 180 minutes.

Alternatively (or in addition), the information may include at least one of: (i) numbers of data packets transmitted during the VOIP calls; and (ii) numbers of data packets received during VOIP calls. The analysis may include determining whether the numbers of data packets transmitted during the VOIP calls, and/or the numbers of data packets received during VOIP calls, are substantially unchanging over time. Preferably a determination is made that a given call is inactive when the number of data packets transmitted and/or received during that call over a given period of time does not exceed a threshold level. The threshold level may be variable dependent on one or more other parameters.

The at least one command may be sent from the administrative entity to the one or more session controllers over the packet switched network.

In accordance with one or more further aspects of the present invention, a method includes: sending a request for information from an administrative entity to one or more session controllers operatively coupled between one or more packet switched networks and one or more public switched telephone networks, the information concerning one or more voice-over-Internet (VOI) calls being supported by the one or more session controllers; and sending at least one command from the administrative entity to the one or more session controllers that causes the session controllers to drop any VOIP calls that are inactive.

Preferably, the step of sending the request for information from the administrative entity to the one or more session controllers is carried out at a predetermined rate.

In accordance with one or more further aspects of the present invention, a method includes: receiving a request for information from an administrative entity at one or more session controllers operatively coupled between one or more packet switched networks and one or more public switched telephone networks, the information concerning one or more voice-over-Internet (VOI) calls being supported by the one or more session controllers; sending the information from the one or more session controllers to the administrative entity; and receiving at least one command at the one or more session controllers from the administrative entity causing the one or more session controllers to drop any VOIP calls that are inactive.

In accordance with one or more further aspects of the present invention, an administrative server includes: a receiver operable to obtain information concerning one or more voice-over-Internet (VOI) calls gathered at one or more session controllers operatively coupled between one or more packet switched networks and one or more public switched telephone networks; an analyzer operable to process the information to determine whether any of the calls are inactive; and a transmitter operable to send at least one command to the one or more session controllers that causes the session controllers to drop any VOIP calls that are determined to be inactive.

In accordance with one or more further aspects of the present invention, an administrative server includes: a transmitter operable to: (i) send a request for information to one or more session controllers operatively coupled between one or more packet switched networks and one or more public switched telephone networks, the information concerning one or more voice-over-Internet (VOI) calls being supported by the one or more session controllers; and (ii) send at least one command to the one or more session controllers that causes the session controllers to drop any VOIP calls that are determined to be inactive.

In accordance with one or more further aspects of the present invention, an apparatus is operable to execute a software program that causes a processor and supporting devices to carry out actions. The actions include: sending a request for information to one or more session controllers operatively coupled between one or more packet switched networks and one or more public switched telephone networks, the information concerning one or more voice-over-Internet (VOI) calls being supported by the one or more session controllers; receiving the information from the one or more session controllers; analyzing the information to determine whether any of the calls are inactive; and sending at least one command to the one or more session controllers that causes the session controllers to drop any VOIP calls that are determined to be inactive.

In accordance with one or more further aspects of the present invention, an apparatus includes: means for sending a request for information to one or more session controllers operatively coupled between one or more packet switched networks and one or more public switched telephone networks, the information concerning one or more voice-over-Internet (VOI) calls being supported by the one or more session controllers; means for receiving the information from the one or more session controllers; means for analyzing the information to determine whether any of the calls are inactive; and means for sending at least one command to the one or more session controllers that causes the session controllers to drop any VOIP calls that are determined to be inactive.

In accordance with one or more further aspects of the present invention, a session controller is operatively coupled between one or more packet switched networks and one or more public switched telephone networks. The session controller includes: a receiver operable to receive a request for information from an administrative entity, the information concerning one or more voice-over-Internet (VOI) calls being supported by the session controller; and a transmitter operable to send the information to the administrative entity, wherein the session controller is operable to receive at least one command from the administrative entity causing the session controller to drop any VOIP calls that are inactive.

In accordance with one or more further aspects of the present invention, a session controller is operable to execute a software program that causes the session controller and any associated devices to execute steps. The steps include: receiving a request for information from an administrative entity, the information concerning one or more voice-over-Internet (VOI) calls being supported by the one or more session controllers; sending the information to the administrative entity; and receiving at least one command from the administrative entity causing the session controller to drop any VOIP calls that are inactive.

In accordance with one or more further aspects of the present invention, the session controller includes: means for receiving a request for information from an administrative entity, the information concerning one or more voice-over-Internet (VOI) calls being supported by the one or more session controllers; means for sending the information to the administrative entity; and means for receiving at least one command from the administrative entity causing the session controller to drop any VOIP calls that are inactive.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

FIG. 3 is a flow diagram illustrating process steps that may be carried out by one or more of the system elements of FIG. 1 or 2 in accordance with still further aspects of the present invention.

DETAILED DESCRIPTION OF THE PREFERRED EMBODIMENTS

Figure 1:
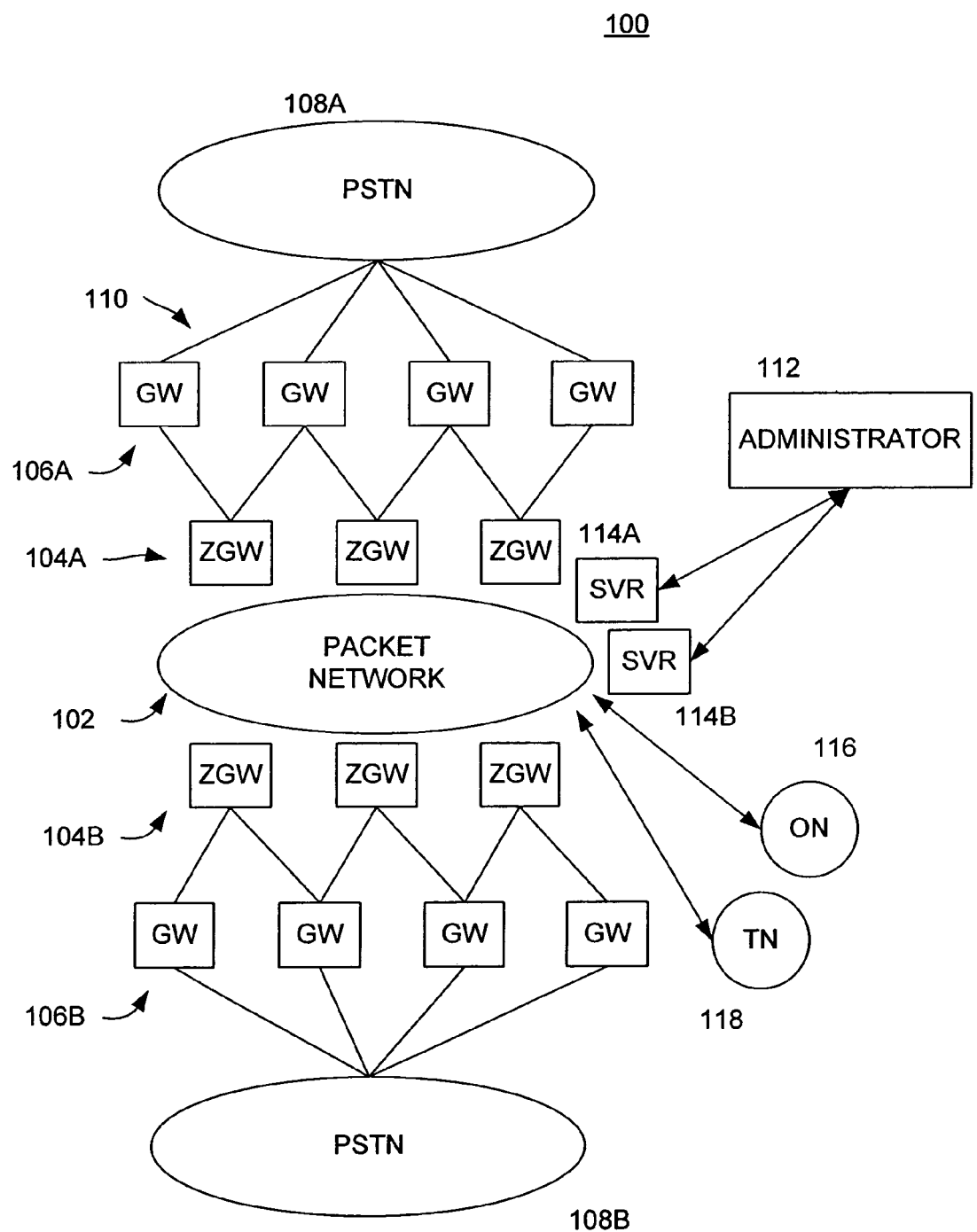
FIG. 1 is a block diagram of a system capable of facilitating VOIP calls in accordance with one or more aspects of the present invention.

With reference to the drawings, wherein like numerals indicate like elements, there is shown in FIG. 1 a block diagram of an exemplary communication system 100 incorporating one or more aspects of the present invention. In particular, the system 100 may connect a user of a VOIP telephony-enabled (e.g., an Internet telephony enabled) client computer or a PSTN initiating telephone with a user of a PSTN terminating telephone or a VOIP telephony-enabled client computer.

While the present invention will be described in the context of this exemplary computer system, based on the descriptions to follow, those skilled in the art will appreciate that the present invention is not limited to this embodiment, and may be also practiced with intranet (in lieu of the Internet) and/or automated/computerized telephony answering equipment (in lieu of telephone handsets).

The communication system 100 includes a packet switched network 102, such as the Internet, a plurality of zone gateways (ZGWs) 104A, 104B, a plurality of "local" gateways (GWs) 106A, 106B and one or more PSTNs 108A, 108B. The zone gateways 104 are geographically distributed about the network 102 and may be grouped into a first set 104A that is generally associated with the PSTN 108A and a second group 104B that is generally associated with the PSTN 108B. The local gateways 106 provide a protocol bridge function inasmuch as they act as interfaces between the packet switched network 102 and the public switched networks 108. The local gateways 106 are preferably distributed about the respective PSTNs 108 in order to facilitate efficient access to various portions of the networks. A first set of the local gateways 106A may be considered to be associated with the PSTN 108A, while a second set of the local gateways 106B may be considered to be associated with the PSTN 108B.

The system 100 also includes an administrator 112 that is coupled to the packet switched network 102 through one or more servers 114A, 114B. The general function of the administrator 112 and the associated server(s) 114 may be better understood in connection with an illustrative example of the use of the system 100. Assuming that a user (initiator) within the PSTN 108A seeks to place a call to a user of the PSTN 108B, the initiator may utilize his or her telephone (or client terminal) to enter the telephone number of the receiving user in the PSTN 108B. This telephone number will be transmitted to one of the local gateways 106A over one of the trunk lines 110. That local gateway 106 will transmit the telephone number and its location to the administrator 112 through one or more of the servers 114. The administrator 112 uses this information to determine which of the local gateways 106B is most appropriate to route the call to the receiving user within the PSTN 108B. The administrator 112 also manages the billing associated with use of the respective trunk lines and other components of the respective PSTNs 108A, 108B.

One skilled in the art will appreciate that the communication system 100 illustrated in FIG. 1 is significantly more complex than that which is depicted. For example, each of the PSTNs 108A, 108B includes a number of Service Switching Points (SSPs), Signal Transfer Points STPs), and Service Control Points (SCPs) coupled to one another (not shown).

Each "local" SSP is coupled to an associated STP, which in turn is coupled to other "remote" SSPs. Each of the remote SSPs is coupled to a number of "remote" PSTN extensions. As is well known in the art, The Internet 102 includes a number of networks interconnected by routers, which also interconnect a plurality of client computers and other equipment, web servers and bridgeports. The Internet 102 includes well over several hundred thousand networks. Together, the PSTNs 108A, 108B and the Internet 102 interconnect millions of client computers and web servers. Nonetheless, FIG. 1 captures a number of the components of the communication system 100 necessary to illustrate the interrelationships between system components such that one skilled in the art may practice the present invention.

It is noted that the system 100 contemplates many more PSTNs 108 than are depicted in FIG. 1. Moreover, the system 100 is not limited to VOIP calls emanating from and terminating in respective PSTNs 108. Indeed, any number of other originating networks (ON) 116 and/or terminating networks (TN) 118 are contemplated as falling within the spirit and scope of the invention as claimed. It is noted that these originating networks 116 and/or terminating networks 118 may be coupled to the packet switch network 102 (directly or indirectly) or may be coupled to one or more of the gateways, such as the local gateways 106 or the zone gateways 104.

The zone gateways 104, the local gateways 106 and/or the servers 114 and administrator 112 are intended to represent a broad category of web servers, including corporate presence servers and/or government presence servers, which are known in the art. Any number of high performance computer servers may be employed to implement these devices, e.g., a computer server equipped with one or more Pentium processors from Intel Corp., running the Mircrosoft Windows NT operating system, or a computer server equipped with one or more SPARC processors from Sun Microsystems of Mountain View, Calif., running the Sun Solaris operating system.

Figure 2:
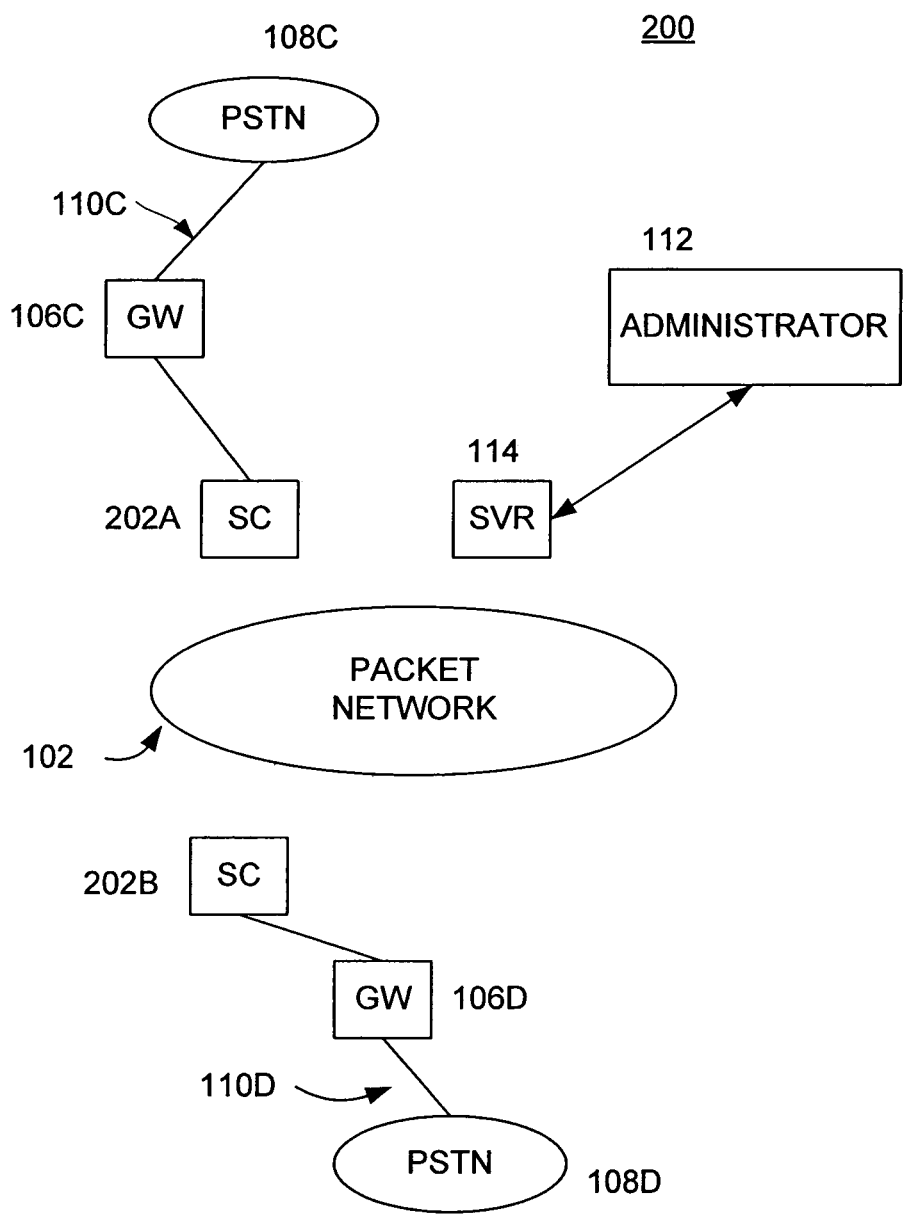
FIG. 2 is a block diagram of an alternative system capable of facilitating VOIP calls in accordance with one or more further aspects of the present invention.

With reference to FIG. 2, an alternative communication system 200 (which also may be used in conjunction with the system 100 of FIG. 1) is illustrated. The system 200 is substantially similar to that of FIG. 1 except that it includes session controllers (SC) 202 instead of (or in addition to) the zone gateways 104. It is noted that the communication system 200 is even more simplified as compared with that of FIG. 1. Indeed, one skilled in the art will appreciate that many more session controllers 202 and/or local gateways 106 would be employed in a practical system. The session controllers 202 are preferably VOIP session controllers acting as firewalls and protocol bridges to facilitate an exchange of network traffic over multiple partner networks.

By way of example, the session controllers 202 may be implemented using Multiprotocol Session Controllers from NexTone of Germantown, Md. The session controllers 202 may be located on the border of the VOIP service provider (such as the ITXC.net) and serve as intermediaries to affiliate VOIP networks. In particular, the session controllers 202 preferably provide dynamic call-admission control, SIP/H.323 signaling interworking and network address translation (NAT) capabilities.

Advantageously, this permits the VOIP service provider to simply and cost-effectively extend its global service with robust and scalable interconnection to virtually any SIP or H.323 based VOIP network. For example, the NexTone session controllers may enable secure and flexible interconnection between VOIP networks regardless of the network call control protocols, equipment vendors, or internal architectures. The use of NexTone session controllers may also eliminate many of the T.38 fax interoperability issues that are common among different equipment vendors' VOIP gateways. These VOIP interconnection capabilities enable the VOIP service provider to interconnect to a diverse range of local VOIP carriers directly across the Internet, without requiring or creating technical dependencies between the service provider's network and peer networks.

It is noted that the session controllers 202 may also be implemented using other manufacturer's equipment, such as by Acme Packet of Wodburn, Mass.; and Emergent Network Solutions, Inc. of Allen, Tex.

With reference to either of the systems of FIGS. 1-2 and FIG. 3, one or more aspects of the present invention contemplate obtaining information at the administrator 112 concerning the VOIP calls taking place throughout the network, particularly information concerning the information on calls that may be gathered at the local gateways 106 (FIG. 1) and/or the session controllers 202 (FIG. 2). This information if preferably utilized by the administrator 112 in order to determine whether any of the calls are inactive (e.g. hung). If so, the administrator 112 is preferably operable to send one or more commands to the zone gateways 104 and/or the session controllers 202 that cause them to drop any VOIP calls that are determined to be inactive.

With specific reference to FIG. 3, at action 300, the administrator 112 preferably sends a request for information to the zone gateways 104 and/or the session controllers 202. Preferably, the request is sent over the packet switched network 102, although a given request for information may be sent over an alternative link all depending on whether alternative data communications between the administrator 112 and any of the gateways and/or session controllers exists. At action 302, one or more of the zone gateways 104 and/or the session controllers 202 receives the request for information from the administrator 112. In response, the gateways 104 and/or the session controllers 202 gather the requested information, such as call IDs, uptime values, number of RTCP packets, etc. At action 304, the requested information is preferably transmitted from the respective zone gateways 104 and/or session controllers 202 to the administrator 112.

At action 306, the administrator 112 analyzes the information provided by the zone gateways 104 and/or the session controllers 202 to determine whether any of the calls are inactive. For example, the analysis may include determining whether any of the uptime values exceeds a threshold level. A determination may be made that a given call is inactive when the uptime value of that call exceeds the threshold level, such as 180 minutes (action 308). Preferably, the threshold level is variable and may be established by the administrator 112 depending on one or more other parameters, such as system load, etc. In an alternative embodiment of the invention, the information concerning the VOIP calls may include the numbers of data packets transmitted during the VOIP calls and/or the numbers of data packets received during the VOIP calls. In this embodiment, the analysis of the information by the administrator 112 may include determining whether the numbers of data packets transmitted and/or received during the VOIP calls are substantially unchanging over time. For example, a determination may be made that a given call is inactive when the number of data packets transmitted and/or received during that call over a given period of time does not exceed a threshold level. Again, the threshold level is preferably variable depending on one or more other parameters.

If a determination is made at action 308 that a call is not hung, then the process flow preferably feeds back to action 300 where another request for information is made by the administrator 112. In this regard, the administrator 112 preferably sends the requests for information at a predetermined rate, such as five minutes, ten minutes, etc. Preferably, the predetermined rate is variable depending on one or more other parameters, such as the processing load on the respective zone gateways 104 and/or the session controllers 202. Indeed, if the load on a given one or more of the zone gateways 104 and/or the session controllers 202 is substantially high, then the administrator 112 may reduce the frequency at which it requests the information in order to lessen the burden on the devices and improve transmitting efficiencies.

If the determination at action 308 is in the affirmative (i.e., it is determined that a call is hung), then the administrator 112 preferably sends at least one command to the one or more zone gateways 104 and/or the session controllers 202 that causes them to drop any VOIP calls that are determined to be inactive (action 310). Preferably, the step of sending the command to terminate the call or calls includes transmitting the at least one command from the administrator 112 to the zone gateway 104 and/or the session controller 202 over the packet switched network 102. In this regard, the zone gateways 104 and/or the session controllers 202 are preferably operable to receive the command or commands from the administrator 112 and to take steps to drop any VOIP calls that are inactive in response.

Advantageously, the various aspects of the present invention may permit the detection and elimination of hung calls in a VOIP network that is flexible to the service provider and that minimizes overload tasks by the system gateways.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for controlling a voice-over-Internet (VOIP) network including session controllers for calls on the VOIP network, said method comprising:
   obtaining, by an administrative server, information on the VOIP network concerning one or more VOIP calls gathered at one or more session controllers which control setting up, maintaining and tearing down calls at different network locations;
   analyzing, by the administrative server, the information received from a first session controller to determine whether any of the VOIP calls between a gateway associated with said first session controller and an additional gateway associated with a different session controller are inactive; and
   sending, by the administrative server, at least one command to one or more of the session controllers that causes the one or more session controllers to drop any VOIP calls that are determined to be inactive based upon the analyzing of the information received from the first session controller.

2. The method of claim 1, wherein the information concerning the VOIP calls includes call IDs and uptime values.

3. The method of claim 2, wherein the step of analyzing the information includes determining whether any of the uptime values exceeds a threshold level.

4. The method of claim 3, wherein a determination is made that a given call is inactive when the uptime value of that call exceeds the threshold level.

5. The method of claim 3, wherein the threshold level is variable dependent on one or more other parameters.

6. The method of claim 3, wherein the threshold level is 180 minutes.

7. The method of claim 1, wherein the information includes at least one of: (i) numbers of data packets transmitted during the VOIP calls; and (ii) numbers of data packets received during VOIP calls.

8. The method of claim 7, wherein the step of analyzing the information includes determining whether the numbers of data packets transmitted during the VOIP calls, and/or the numbers of data packets received during VOIP calls, are substantially unchanging over time.

9. The method of claim 8, wherein determination is made that a given call is inactive when the number of data packets transmitted and/or received during that call over a given period of time does not exceed a threshold level.

10. The method of claim 9, wherein the threshold level is variable dependent on one or more other parameters.

11. The method of claim 1, wherein the command is transmitted over a packet switched network.

12. A method for controlling a voice-over-Internet (VOIP) network including session controllers which control setting up, maintaining and tearing down of calls at different locations on the VOIP network, said method comprising:
    sending, by an administrative server, a request for information on the VOIP network to one or more session controllers concerning one or more VOIP calls being supported by one or more of the session controllers;
    receiving, by the administrative server, the information from the one or more session controllers;
    analyzing, by the administrative server, the information received to determine whether any of the VOIP calls are inactive; and
    sending, by the administrative server, at least one command to the one or more session controllers that causes the session controllers to drop any VOIP calls that are determined to be inactive based upon the analyzing of the information and upon information gathered from one session controller relating to VOIP calls between multiple gateways.

13. The method of claim 12, wherein the administrative server sends the request for information at a predetermined rate.

14. The method of claim 13, wherein the predetermined rate is variable depending on one or more other parameters.

15. The method of claim 13, wherein the one or more other parameters include a processing load on the session controllers.

16. The method of claim 12, wherein:
    the information concerning the VOIP calls includes call IDs and uptime values;
    the step of analyzing the information includes determining, by the administrative server, that a given VOIP call is inactive when the uptime value thereof exceeds a threshold level.

17. The method of claim 12, wherein:
    the information includes numbers of data packets transmitted and/or received during the VOIP calls;
    the step of analyzing the information includes determining, by the administrative server, that a given VOIP call is inactive when the numbers of data packets transmitted and/or received during that call are substantially unchanging over time.

18. The method of claim 12, wherein the at least one command is transmitted over a packet switched network.

19. An administrative server on a voice-over-Internet (VOIP) network said administrative server comprising:

a receiver configured to receive data passing through one of more gateways concerning VOIP calls processed by each of said one or more gateways, an analyzer configured to analyze the data received to determine whether any of the VOIP calls between the one or more gateways are inactive, and a transmitter configured to transmit to at least one of said gateways a command to tear down a VOIP call between said at least one of said gateways and at least one other gateway if said data when analyzed by the analyzer indicates that the VOIP call is inactive.

20. The administrative server of claim 19, wherein the data includes call IDs and uptime values.

21. The administrative server of claim 20, wherein the analyzer is configured to determine whether any of the uptime values exceeds a threshold level.

22. The administrative server of claim 21, wherein determination is made that a given call is inactive when the uptime value of that call exceeds the threshold level.

23. The administrative server of claim 21, wherein the administrative server is configured to modify the threshold level dependent on one or more other parameters.

24. The administrative server of claim 21, wherein the threshold level is 180 minutes.

25. The administrative server of claim 19, wherein the data includes at least one of: (i) numbers of data packets transmitted during the VOIP calls; and (ii) numbers of data packets received during VOIP calls.

26. The administrative server of claim 25, wherein the analyzer of the administrative server is configured to determine whether the numbers of data packets transmitted during the VOIP calls, and/or the numbers of data packets received during VOIP calls, are substantially unchanging over time.

27. The administrative server of claim 26, wherein a determination is made that a given call is inactive when the number of data packets transmitted and/or received during that call over a given period of time does not exceed a threshold level.

28. The administrative server of claim 27, wherein the administrative server is configured to vary the threshold level dependent on one or more other parameters.

29. The administrative server of claim 19, wherein the administrative server is configured to transmit the at least one command to one or more session controllers over the one or more packet switched networks.

30. An administrative server on a voice-over-Internet (VOIP) network, said VOIP network comprising plural gateways which service VOIP calls by establishing connections over the Internet, said administrative server comprising:

a receiver for receiving information from each of the plural gateways, said information relating to packets to be exchanged between a first gateway and another of said gateways, an analyzer configured to analyze the information received to determine whether any of the VOIP calls between the one or more gateways are inactive, and a transmitter for transmitting a command to said first gateway to tear down a VOIP call if said information when analyzed by the analyzer indicates the VOIP call between said first gateway from which said information was received and a different gateway is inactive.

31. The administrative server of claim 30, wherein the server is configured operable to send a request for information to one or more session controllers at a predetermined rate, and wherein said session controllers send said request to said first gateway.

32. The administrative server of claim 31, wherein the predetermined rate is variable depending on one or more other parameters.

33. The administrative server of claim 31, wherein the one or more other parameters include a processing load on the session controllers.

34. The administrative server of claim 30, wherein:
the information concerning the VOIP calls includes call IDs and uptime values;
the analyzer is configured to determine that a call is inactive when the uptime value thereof exceeds a threshold level.

35. The administrative server of claim 30, wherein:
the information includes numbers of data packets transmitted and/or received during the VOIP calls;
the analyzer is configured to determine that a call is inactive when the numbers of data packets transmitted and/or received during that call are substantially unchanging over time.

36. The administrative server of claim 30, wherein the transmitter is configured to send the at least one command to one or more session controllers over the one or more packet switched networks.

37. An apparatus on a voice-over-Internet (VOIP) network including session controllers for setting up, maintaining and tearing down calls at different locations on the VOIP network, said session controllers being associated with one or more gateways, said apparatus configured to execute a software program that causes a processor and supporting devices to carry out actions, comprising:

sending a request for information to said session controllers, the information concerning one or more VOIP calls being supported by one or more of the session controllers;

receiving the information from the one or more session controllers;

analyzing the information received to determine whether any of the VOIP calls are inactive; and sending at least one command to the session controllers and the gateways that causes the session controllers and the gateways to drop any VOIP calls that are determined to be inactive based upon the analyzing of the information.

38. The apparatus of claim 37 wherein communications between sessions controllers and said apparatus is via an alternative channel.

* * * * *